(12) United States Patent
Falk

(10) Patent No.: US 7,480,070 B2
(45) Date of Patent: Jan. 20, 2009

(54) SPOT COLOR PATTERN SYSTEM

(75) Inventor: Richard Falk, San Mateo, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 640 days.

(21) Appl. No.: 09/991,036

(22) Filed: Nov. 20, 2001

(65) Prior Publication Data

US 2003/0095271 A1    May 22, 2003

(51) Int. Cl.
*G06F 15/00* (2006.01)
*G06K 1/00* (2006.01)
*G06K 15/00* (2006.01)

(52) U.S. Cl. .................. 358/1.18; 358/1.16; 358/1.17

(58) Field of Classification Search ............... 358/1.9, 358/1.12, 1.16–1.18, 3.13, 3.23, 1.11
See application file for complete search history.

(56) References Cited

U.S. PATENT DOCUMENTS

| | | | |
|---|---|---|---|
| 4,398,890 A | 8/1983 | Knowlton | 434/96 |
| 4,998,144 A | 3/1991 | Karn | 355/326 |
| 5,222,154 A | 6/1993 | Graham et al. | 382/18 |
| 5,557,393 A | 9/1996 | Goodman et al. | 355/326 |
| 5,701,401 A * | 12/1997 | Harrington et al. | 358/1.9 |
| 5,751,829 A | 5/1998 | Ringland et al. | 382/100 |
| 5,786,823 A | 7/1998 | Madden et al. | 345/431 |
| 5,822,503 A * | 10/1998 | Gass et al. | 358/1.9 |
| 5,897,239 A | 4/1999 | Caruthers et al. | 399/54 |
| 5,909,220 A | 6/1999 | Sandow | 345/431 |
| 6,002,893 A | 12/1999 | Caruthers, Jr. | 399/54 |

(Continued)

FOREIGN PATENT DOCUMENTS

EP    0562971    3/1993 .................. 17/4

(Continued)

OTHER PUBLICATIONS

Postscript® Language Reference, third editon, Adobe Systems Incorporated, Addison-Wesley Publishing Company, copyright 1999, pp. 248-287.*

(Continued)

*Primary Examiner*—Edward L. Coles
*Assistant Examiner*—James A Thompson
(74) *Attorney, Agent, or Firm*—Michael A. Glenn; Glenn Patent Group

(57) ABSTRACT

A spot color pattern system provides a naming convention that allows the user to name a custom spot color pattern. A Raster Image Processing (RIP) has a database of spot color patterns that are user definable and are patterns which are images of a textile, fabric, metal, etc., that are repeatedly printed across the job. The RIP interprets a spot color pattern name in print job, looks up the spot color in its database, pulls up the image associated with the spot color pattern name, adds Postscript® pattern code to the print job to paint the spot color across the background of the print job, realistically simulating the final print media, and adds other code to perform other tasks, such as mirroring or four-way mirroring to prevent stitches from appearing. A RIP user interface gives the user the ability to create, modify, or delete spot color patterns. The invention also provides a mechanism that allows an application program to access a custom spot color pattern from the RIP.

12 Claims, 15 Drawing Sheets

U.S. PATENT DOCUMENTS

| | | | | |
|---|---|---|---|---|
| 6,098,882 | A | 8/2000 | Antognini et al. | 235/454 |
| 6,112,665 | A | 9/2000 | Teter et al. | 101/483 |
| 6,122,391 | A | 9/2000 | Ringland et al. | 382/100 |
| 6,131,096 | A * | 10/2000 | Ng et al. | 707/10 |
| 6,176,427 | B1 | 1/2001 | Antognini et al. | 235/454 |
| 6,179,485 | B1 * | 1/2001 | Harrington | 358/1.9 |
| 6,252,676 | B1 | 6/2001 | Azima et al. | |
| 6,262,811 | B1 * | 7/2001 | Hains et al. | 358/3.13 |
| 6,295,133 | B1 * | 9/2001 | Bloomquist et al. | 358/1.1 |
| 6,456,395 | B1 * | 9/2002 | Ringness | 358/1.9 |
| 6,510,650 | B1 * | 1/2003 | Weder | 47/72 |

FOREIGN PATENT DOCUMENTS

| | | | | |
|---|---|---|---|---|
| EP | 0601787 | 12/1993 | | 13/1 |
| EP | 0606142 | 1/1994 | | 15/1 |
| EP | 0833220 | 9/1997 | | 15/10 |
| EP | 0837401 | 9/1997 | | 17/24 |
| EP | 0522702 | 1/1999 | | 7/40 |
| EP | 0964310 | 12/1999 | | 15/1 |
| WO | WO 97/42603 | 11/1997 | | |
| WO | PCT/US2002/037149 | 3/2003 | | |
| WO | PCT/US2002/037149 | 11/2004 | | |

OTHER PUBLICATIONS

George Alexander, David Baron, Laurel Brunner, John F. Butler, Craig E. Cline, Peter E. Dyson, Stephen E. Edwards, and Caren Elizer; *Color Management, input, Systems, Software, Output: Seybold Seminars 1993, part 1*; Seybold Report on Publishing Systems; May 19, 1993.

Steve McKinstry; *The Pantone Touch*; MacUser; May 1990.

Nicholas H. Allison; *A Brief Glossary of Color: for the New Desktop-Color Publisher, a Glance at some important Terms*; Aldus Magazine; Nov.-Dec. 1990.

* cited by examiner

SPOT COLOR PATTERN SYSTEM

BACKGROUND OF THE INVENTION

1. Technical Field

The invention relates to printing documents in a computer environment.

More particularly, the invention relates to the specification, storage, and printing of background textures for proof printing in a computer environment.

2. Description of the Prior Art

There are several different levels of end-users in the printing arena. High-end users require a printing press environment using equipment such as offset printers or large-bed inkjet printers to create their final products. Mid to low-end users do not have a need for high quality professional printing. Laser printers and low cost inkjet printers will satisfy for their general needs.

Printing press environment customers have specialized demands. Some customers print their jobs on different materials such as metal, fabrics, and textiles. These customers do not know what the final product looks like until the job is printed on the actual media.

The printing process involves sending a file containing the document to an image setter or plate setter printer. The image setter printers transfer the job to film before burning it to plate. Plate setter printers transfer the job directly to plate. The plates are used to print the job on the desired media using a professional printing press. Typically, the final product is sent to the customer for proofing and finalization. Mistakes or unwanted results are expensive and a waste of the media.

Consumer and most business computer users print their jobs on relatively low-cost laser printers and ink jet printers. The media is typically paper and mistakes or unwanted results are fairly inexpensive. Corrections can be performed immediately within the appropriate application program with a short turn-around time from correction to print.

It would be highly desirable for the printing press customers to be able to proof their print jobs on paper-based printers. The only drawback is that, using paper-based printers, the printing press customer does not get a realistic reproduction of his print job. The specialized print media that the printing press customer uses has certain characteristics that cause the print job to appear differently on white or colored paper than on the specialized print media.

Some approaches allow printing press customers to proof their print jobs on paper-based printers. However, these approaches do not allow for a consistent, reproducible method that realistically simulates the printing press customer's specialized print media.

A few of the approaches generate their own pattern type of output without using the Postscript pattern language by printing a large number of small images across the document's background. Other approaches require that the user define an image that covers the entire area of the job. These approaches are very inefficient because they create very large files which extend the download time to the printer and increase processing and memory demands on the printer.

It would be advantageous to provide a spot color pattern system that allows users to proof print jobs that require specialized print media on paper-based printers. It would further be advantageous to provide a spot color pattern system that allows users to define custom textures that match their specialized print media.

SUMMARY OF THE INVENTION

The invention provides a spot color pattern system. The system allows users to proof print jobs that require specialized print media on paper-based printers. In addition, the invention allows users to define custom textures that match their specialized print media.

A preferred embodiment of the invention provides a naming convention that allows the user to name a custom spot color pattern. A Raster Image Processing (RIP) is provided that has a database of spot color patterns that are user definable. Instead of associating a specialized spot color name with a certain color value the name is associated with a pattern. The user defined spot color patterns are patterns which are images of a textile, fabric, metal, etc., that are repeatedly printed across the job.

Print jobs are sent to the RIP. The RIP interprets a spot color pattern name in print job, looks up the spot color in its database, and pulls up the image associated with the spot color pattern name. The RIP adds Postscript pattern code to the print job to draw the pattern and adds other code to perform other tasks, such as mirroring or four-way mirroring to prevent stitches from appearing. The Postscript pattern code paints the spot color across the background or painted into any shape or form on the page of the print job, realistically simulating the final print media.

The invention allows users to import an image and associate it with a spot color name. A RIP user interface gives the user the ability to create, modify, or delete spot color patterns.

The invention also provides a mechanism for application programs that allows the application program to access a custom spot color pattern by requesting the pattern from the RIP. When a user specifies a spot color pattern that is unknown to an application program, the application program queries the RIP for the spot color pattern. If the RIP has the spot color pattern defined in its database, it will send the spot color pattern to the application program.

The application program can also store spot color pattern definitions within its own database that allows users to define and specify a particular spot color pattern. When the user wants to print a job, the application program queries the RIP to see if the RIP has the spot color pattern in its database and downloads it to the RIP if the RIP does not have the spot color pattern in its database. The application program can also blindly download any required spot color patterns to the RIP whenever a job is printed in order to achieve consistency between jobs for that particular application program.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a spot color pattern system in a computer environment. A system according to the invention allows users to proof print jobs that require specialized print media on paper-based printers. In addition, the invention allows users to define custom textures that match their specialized print media.

The invention allows print customers that require specialized print media such as metal or textile to proof their print jobs on paper-based printers by realistically simulating the texture of the actual print media. Spot color patterns combine the concepts of spot colors and patterns and give the user the ability to define custom spot color patterns.

Image setter/plate setter printers typically require customers to submit CMYK files defining the customer's print jobs. This is because the printing press environment requires print jobs to be in grayscale, CMYK, or spot colors.

Spot colors are primarily used in the printing industry to achieve very vibrant, extended gamut colors that are beyond what is available from CMYK. Sometimes spot colors are used for two color printing and duo tones, among other uses. However, spot colors are most commonly used to add more colors to the printing process that are unique. A common application is for printing corporate logos and achieving a certain color, e.g., Coke® Red.

Spot colors are solid colors and are typically specified by a Pantone color number, Toyo, HKS, etc. These color systems offer very stable colors that are standardized as opposed to CMYK. CMYK attempts to be standardized, but it is not as consistent and has variances from system to system.

Application programs, such as Quark Express, Adobe Pagemaker, Adobe Illustrator, Adobe Photoshop, Freehand, etc., describe spot colors using Postscript. When an application program prints a job, the Postscript code for the file that is generated by the application has the spot color name specified in the code (for composite files). For separation files, the convention is to name the spot color in a comment within the file.

Raster Image Processing (RIP) systems trap the spot color names by looking for the CMYK custom color commands or the separation color space comments. The RIP system looks up the color name, picks up accurate color for it, and prints the file. For separation files, the RIP system looks for the comments to find the colors, converts the grayscale to the appropriate color, and prints the file.

The concept of patterns as used herein are patterns that are defined in the Postscript language. Postscript allows for the specification of operators called makepattern and setpattern.

Figure 1:
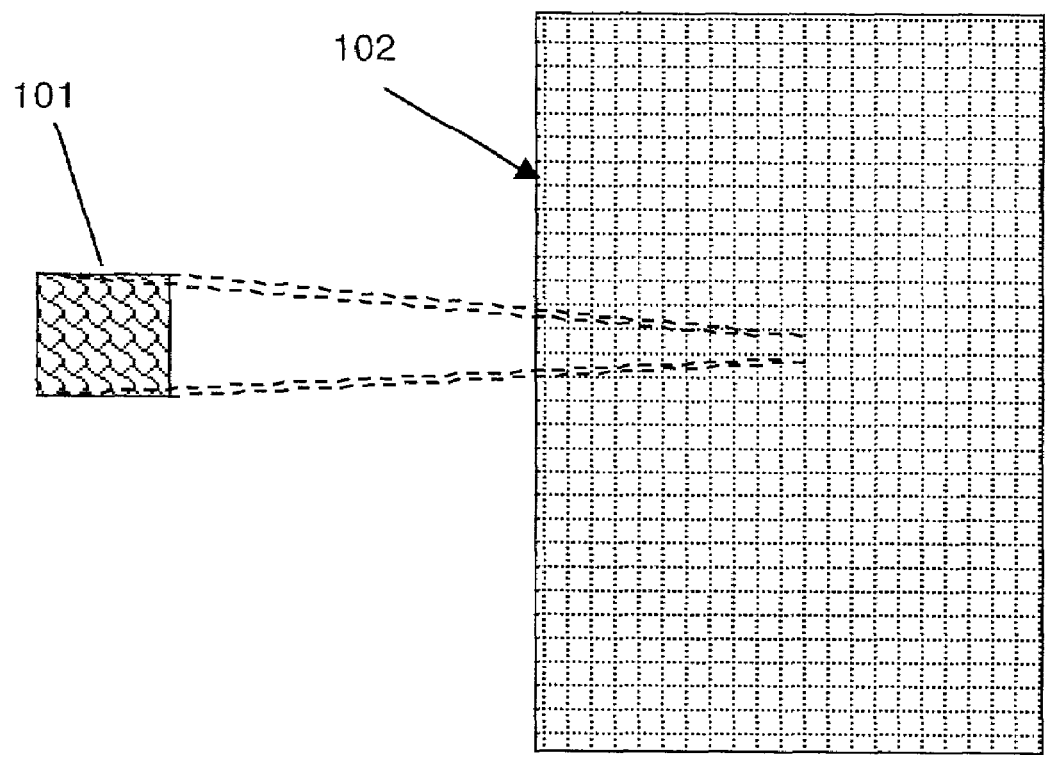
FIG. 1 is a block diagram showing a prior art approach of tiling a large number of small images across a document according to the invention.

Referring to FIG. 1, some application programs generate their own pattern type of output without using the Postscript pattern language by printing a large number of small images 101 across the document's background 102. However, this approach is very inefficient because it creates very large files which are then sent to a printer. The download time to the printer is extended and processing and memory demands on the printer side are increased.

Most pre-press application programs use a page description language, such as Adobe Postscript®. The Postscript language pattern concept allows the user to define a small, repeated unit and to tell Postscript to paint it over an area, shape, or text, etc.

Some users have a need to look at particular types of spot colors that are, for example, metallic in nature and/or have some texture. This is because the user may be printing the final job on a certain type of metal or on material that has an actual pattern, such as textile and fabric, for example. The printer, however, cannot be changed to print metallic ink or on textile.

These users need a way to proof their print jobs on readily available printers, such as color laser printers or inkjet printers. The ability to proof their print jobs on lower cost printers (using paper) enables the users to cut down on costly mistakes and unwanted results. Certain colors, text, or designs may not appear correctly on the actual print media.

Figure 2:
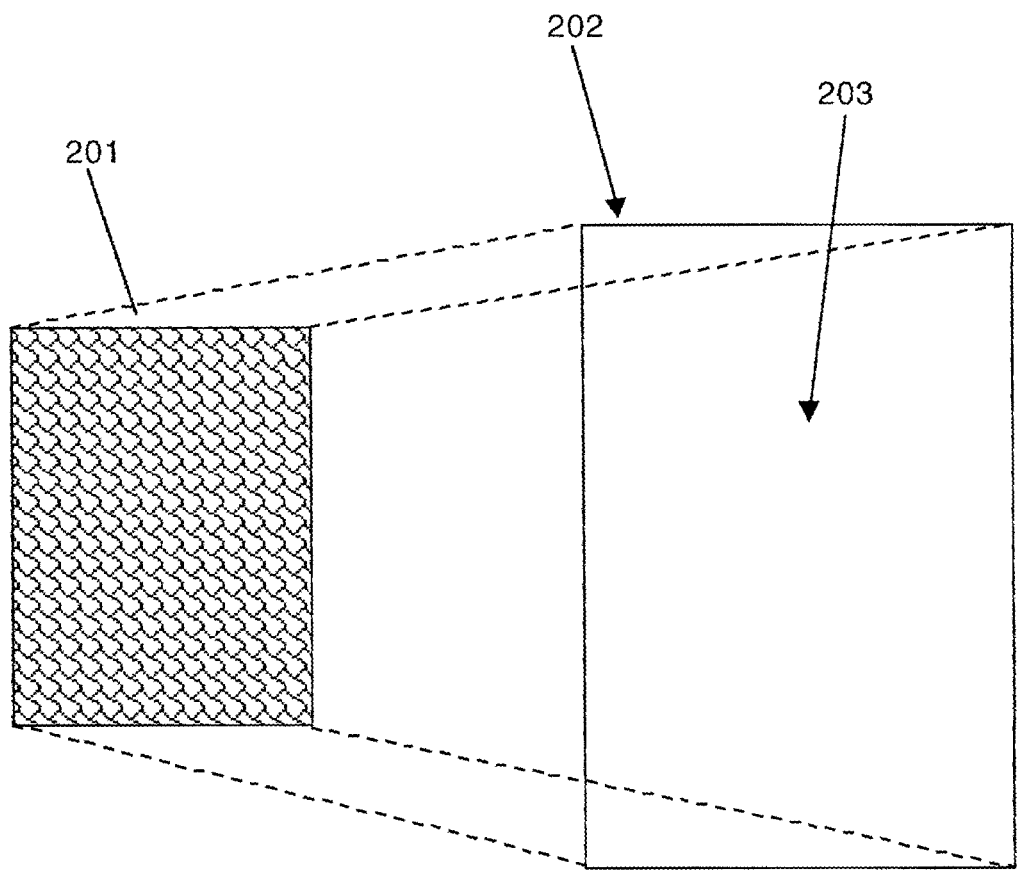
FIG. 2 is a block diagram showing a prior art approach of requiring a user to define an image that covers the entire background of a document according to the invention.

With respect to FIG. 2, prior solutions require that the user define an image 201 that covers the entire area of the job 202. The image 201 is printed as the background 203. This is performed within the application program which requires that the image and job be downloaded to the printer, thereby slowing the printing process down by demanding more download time, processing time, and memory.

Figure 3:
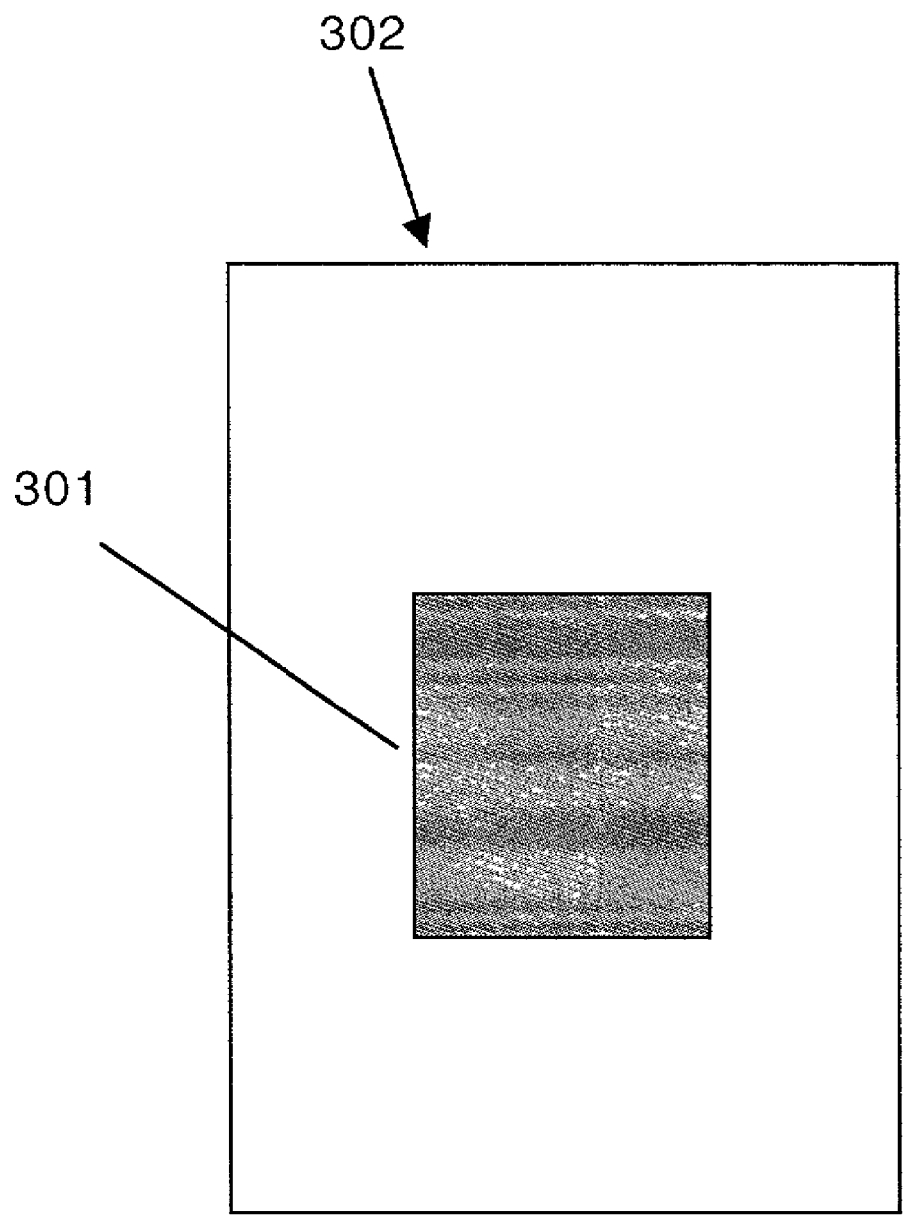
FIG. 3 is a block diagram of a prior art approach of defining a sub-area of a document as an example of the final print job according to the invention.

Referring to FIG. 3, users have also used other approaches such as printing a sub-area 301 of a print job 302 with a solid background spot color that was close to the actual media and using that sub-area as an example of the fabric. These approaches resulted in a less than desired effect that did not realistically simulate the end product.

Figure 4:
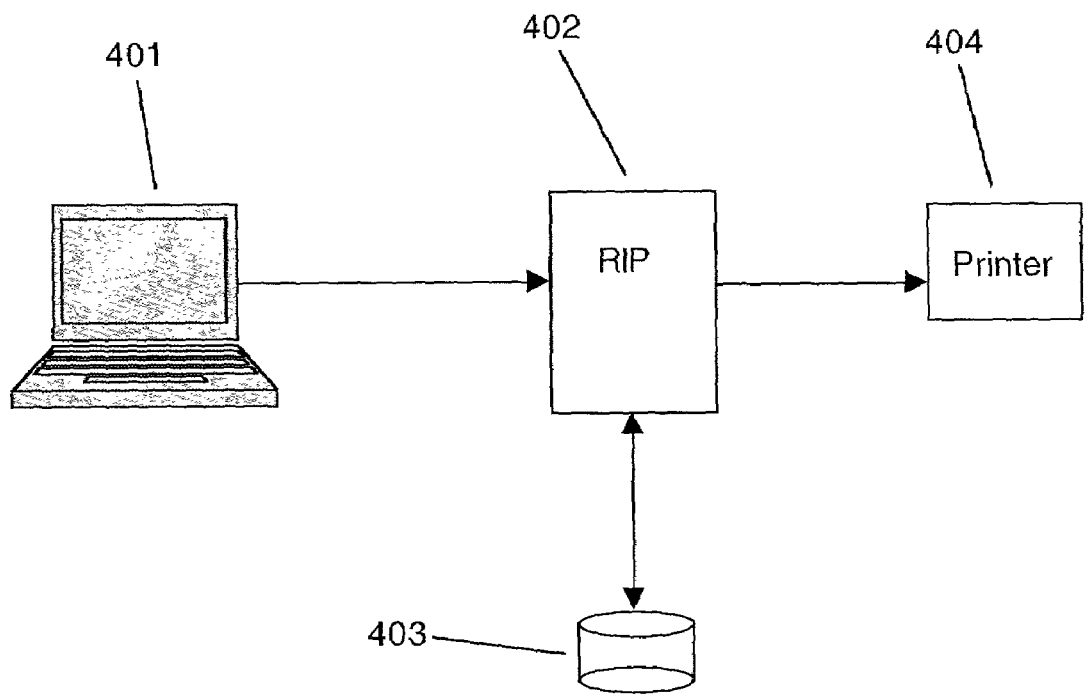
FIG. 4 is a block schematic diagram of a preferred embodiment of the invention illustrating the Raster Image Processor (RIP) based spot color pattern system according to the invention.
Figure 5:
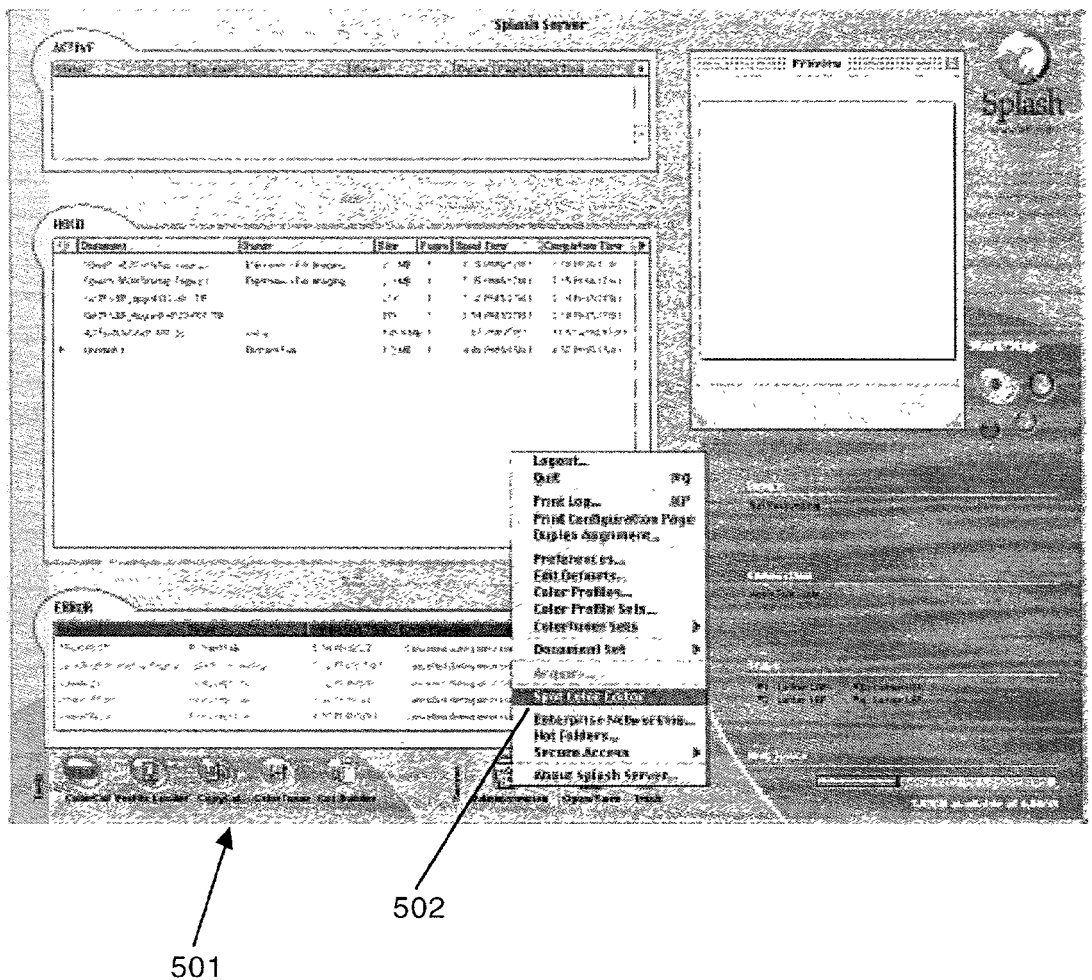
FIG. 5 is a screenshot of a user interface screen for a RIP in a preferred embodiment of the invention illustrating the spot color editor according to the invention.
Figure 6:
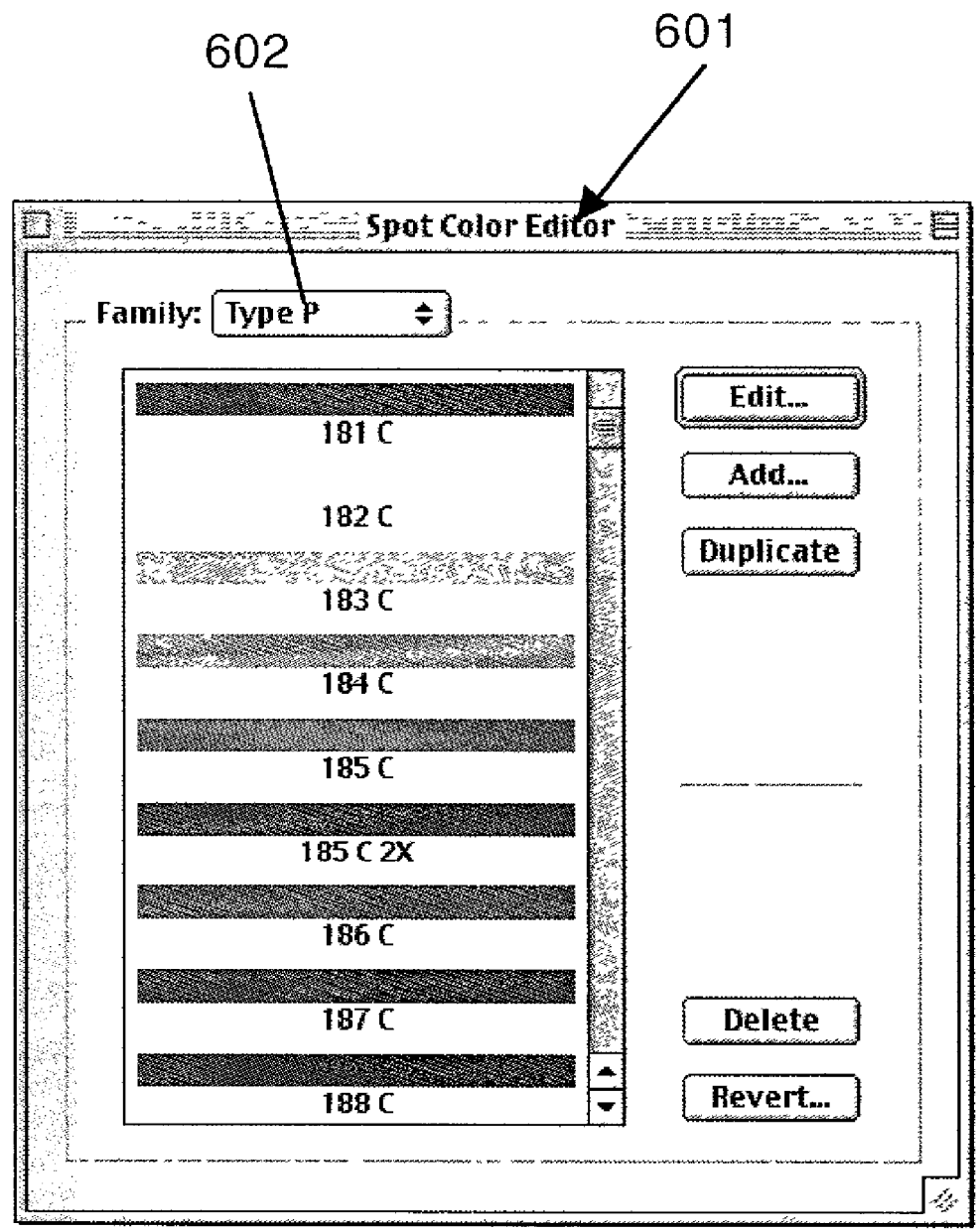
FIG. 6 is a screenshot of a user interface screen for a spot color editor in a preferred embodiment of the invention according to the invention.
Figure 7:
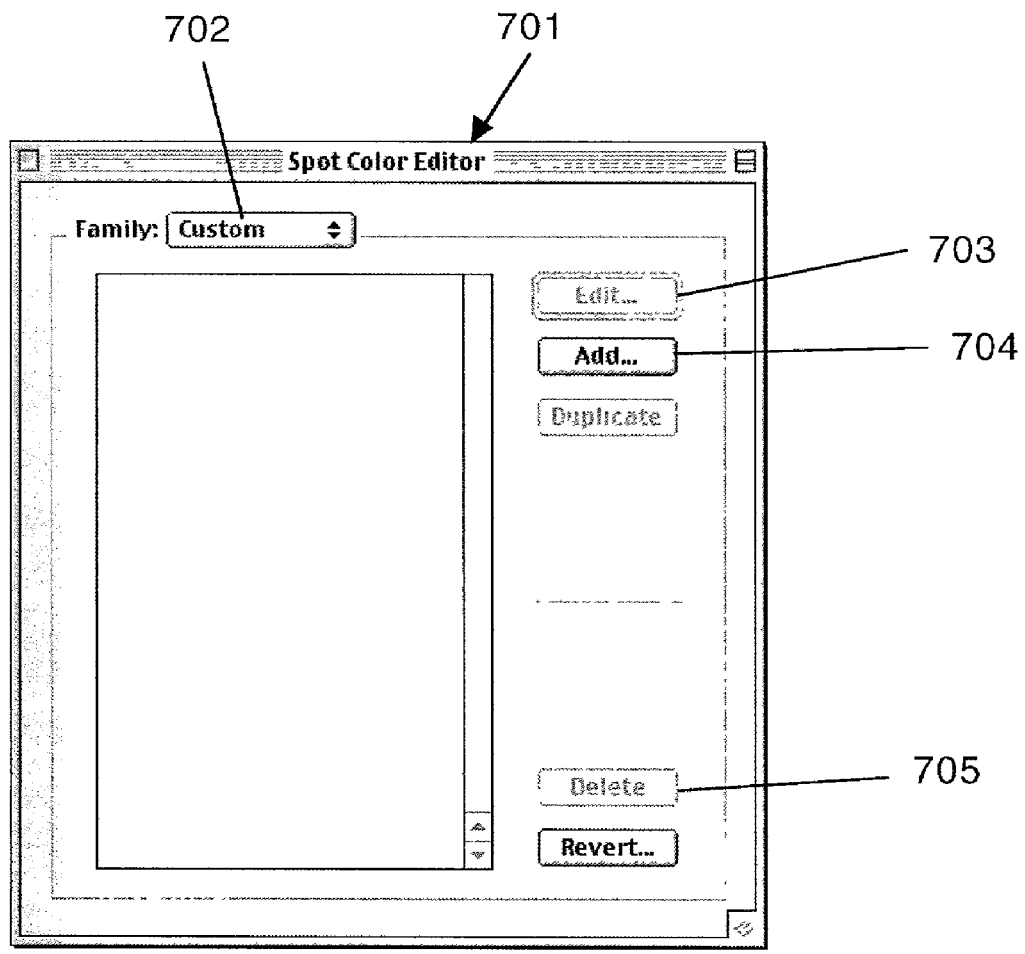
FIG. 7 is a screenshot of a user interface screen for a spot color pattern editor in a preferred embodiment of the invention according to the invention.
Figure 8:
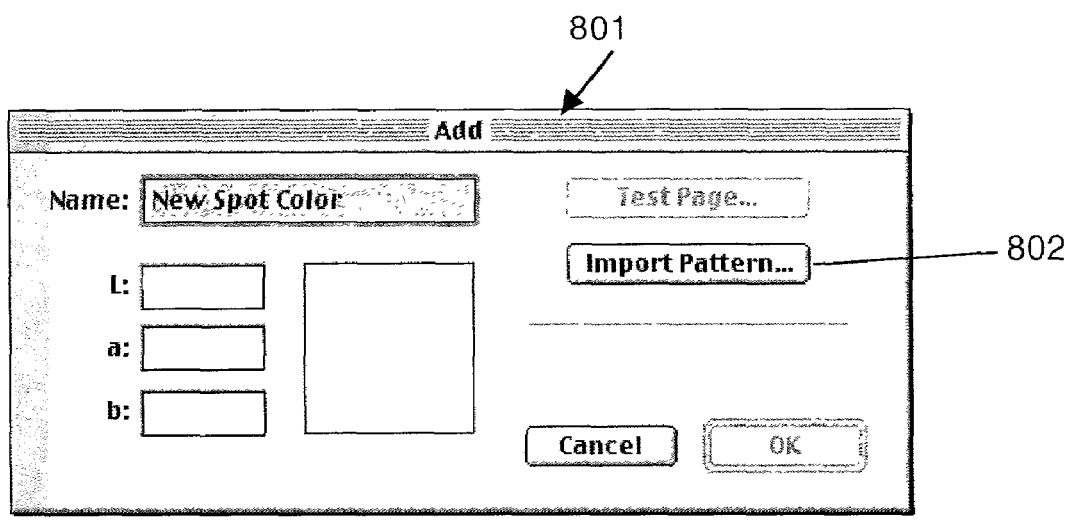
FIG. 8 is a screenshot of a user interface screen for adding a spot color pattern in a preferred embodiment of the invention according to the invention.
Figure 9:
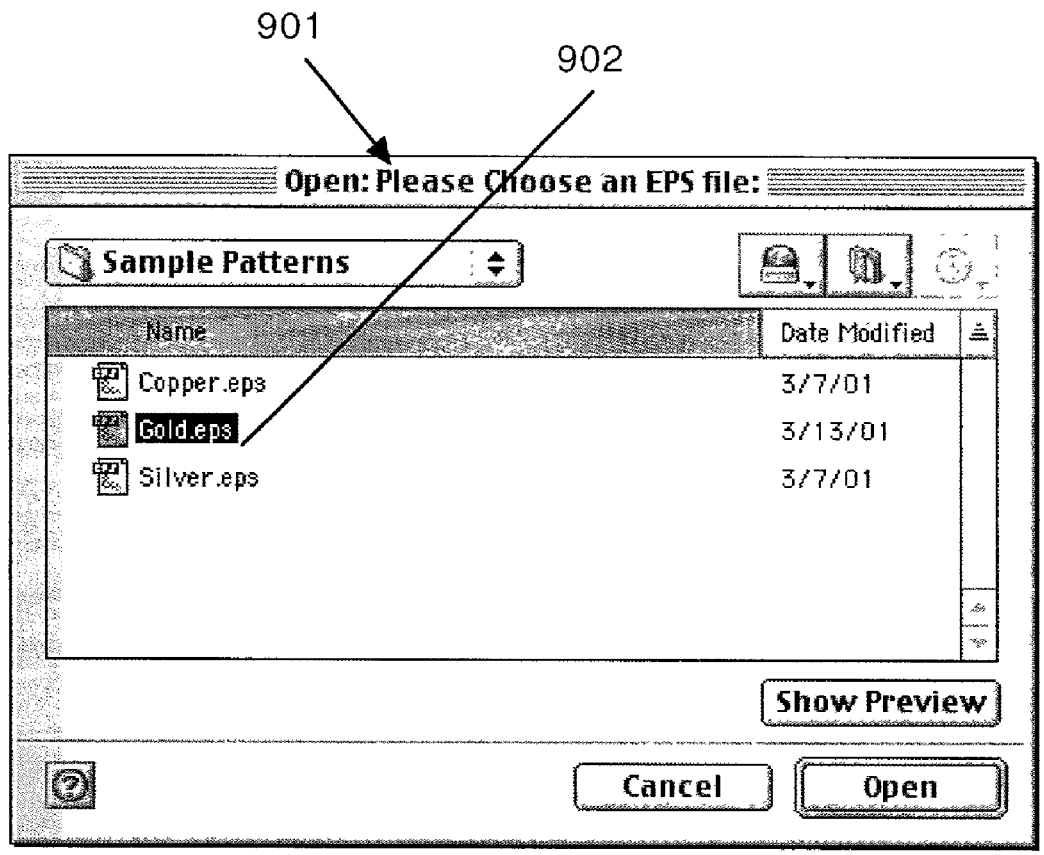
FIG. 9 is a screenshot of a user interface screen for selecting an image for a spot color pattern in a preferred embodiment of the invention according to the invention.
Figure 10:
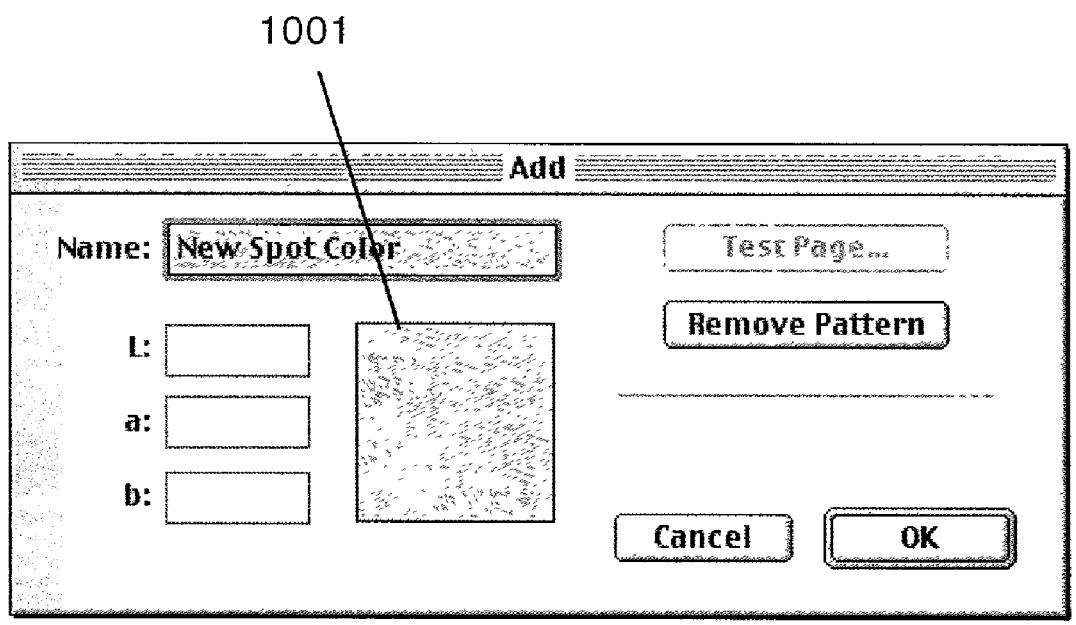
FIG. 10 is a screenshot of a user interface screen for associating an image with a spot color pattern name in a preferred embodiment of the invention according to the invention.
Figure 11:
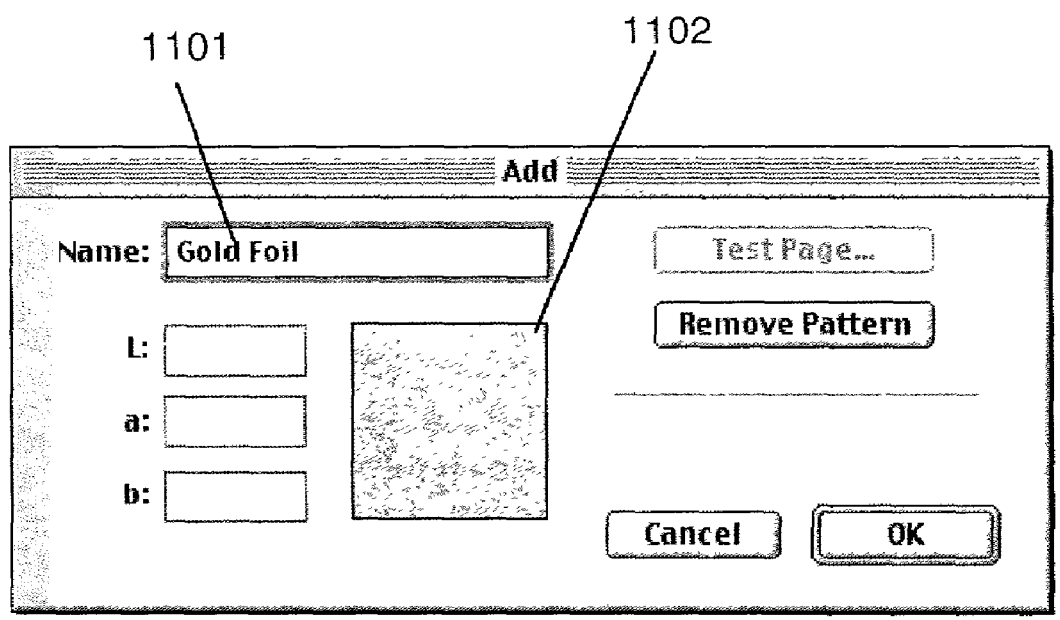
FIG. 11 is a screenshot of a user interface screen for associating an image with a particular spot color pattern name in a preferred embodiment of the invention according to the invention.
Figure 12:
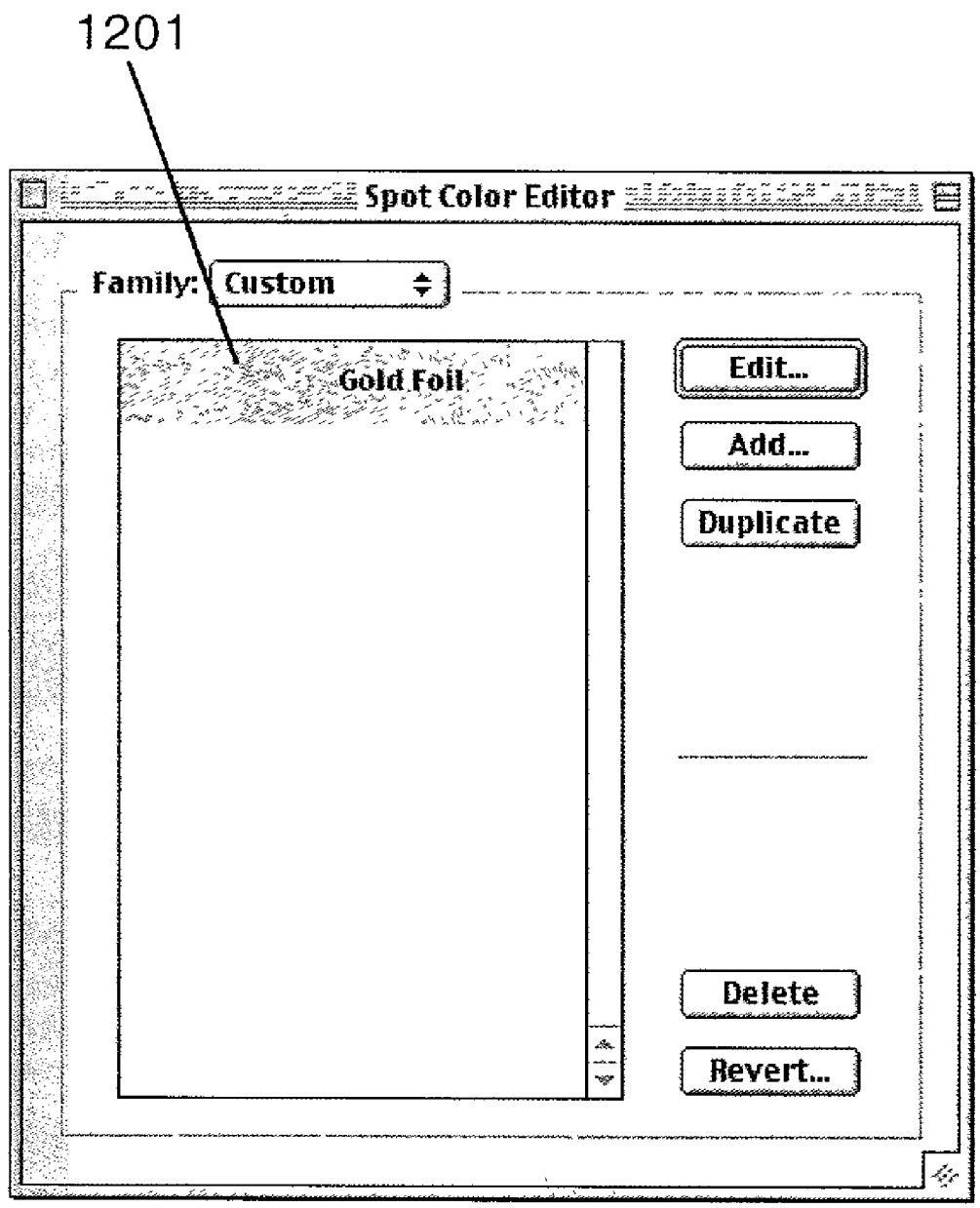
FIG. 12 is a screenshot of a user interface screen listing the spot color patterns in a RIP's database in a preferred embodiment of the invention according to the invention.

With respect to FIG. 4, the invention provides a naming convention that allows the user to name a custom spot color, e.g., Levi® Jeans number 21. The RIP side 402 has a database of spot color patterns 403 that are user definable. Instead of associating the specialized name with a certain color value, such as Pantone 123, the name is associated with a pattern. The user defined spot color patterns are patterns which are images of a textile, fabric, metal, etc., that are repeatedly printed across the job. Print jobs are sent from the user's computer 401 to the RIP 402. When the RIP 402 interprets a spot color pattern name in print job, the RIP 402 looks up the spot color pattern in its database 403, pulls up the associated image, and paints the spot color pattern as a pattern in Postscript. The printer 404 prints the job with the spot color pattern as the background, realistically simulating the final print media. The invention combines the concepts of spot colors with Postscript patterns.

The RIP 402 allows spot colors to work as they normally do and additionally recognizes spot color patterns as special cases. When a spot color pattern is identified, the RIP 402 adds Postscript pattern code to the job to draw the pattern and adds other code to perform mirroring or four-way mirroring (to prevent stitches from appearing), for example. The result is that the user can specify a special color, such as silver, and it is painted just like a regular color, but it looks more realistic because it has a metallic appearance, rather than a solid silver color, like a spot color.

When the user has finished proofing his print job, the spot color pattern callout in the print job is typically removed if the spot color is simulating a paper stock, media or is something added. The callout is left alone if the spot color is a result of the printing process itself e.g., it is used for metallic inks. This allows the user to easily transition from the proof stage to the press stage which prints on the actual print media.

Referring to FIGS. 5-12, the invention allows users to import whatever image that they want. The RIP user interface 501 gives the user the ability to edit spot colors and patterns 502. The user enters the spot color editor 601 and picks the family of spot colors 602. For spot color patterns the user selects "custom" 702. The spot color editor 701 allows the user to edit spot color patterns 703, add new spot color pattern definitions to the RIP's database 704, or delete spot color patterns 705.

When adding a new spot color pattern 801, the user imports the desired image pattern 802. The user selects 901 an image 902 for the RIP to assign to the new spot color pattern, which is displayed to the user 1001. The RIP assigns the spot color name 1101 to the image 1102 in the database 1201.

Any user can then specify the spot color pattern name as a spot color and have it print in a consistent manner from job to job. The user is not aware that the invention inserts the Postscript code to paint the spot color pattern across-the background. All the user has to do is to name the spot color pattern and the invention does the rest. The invention provides a centralized location where spot color patterns are deposited and accessed.

Figure 13:
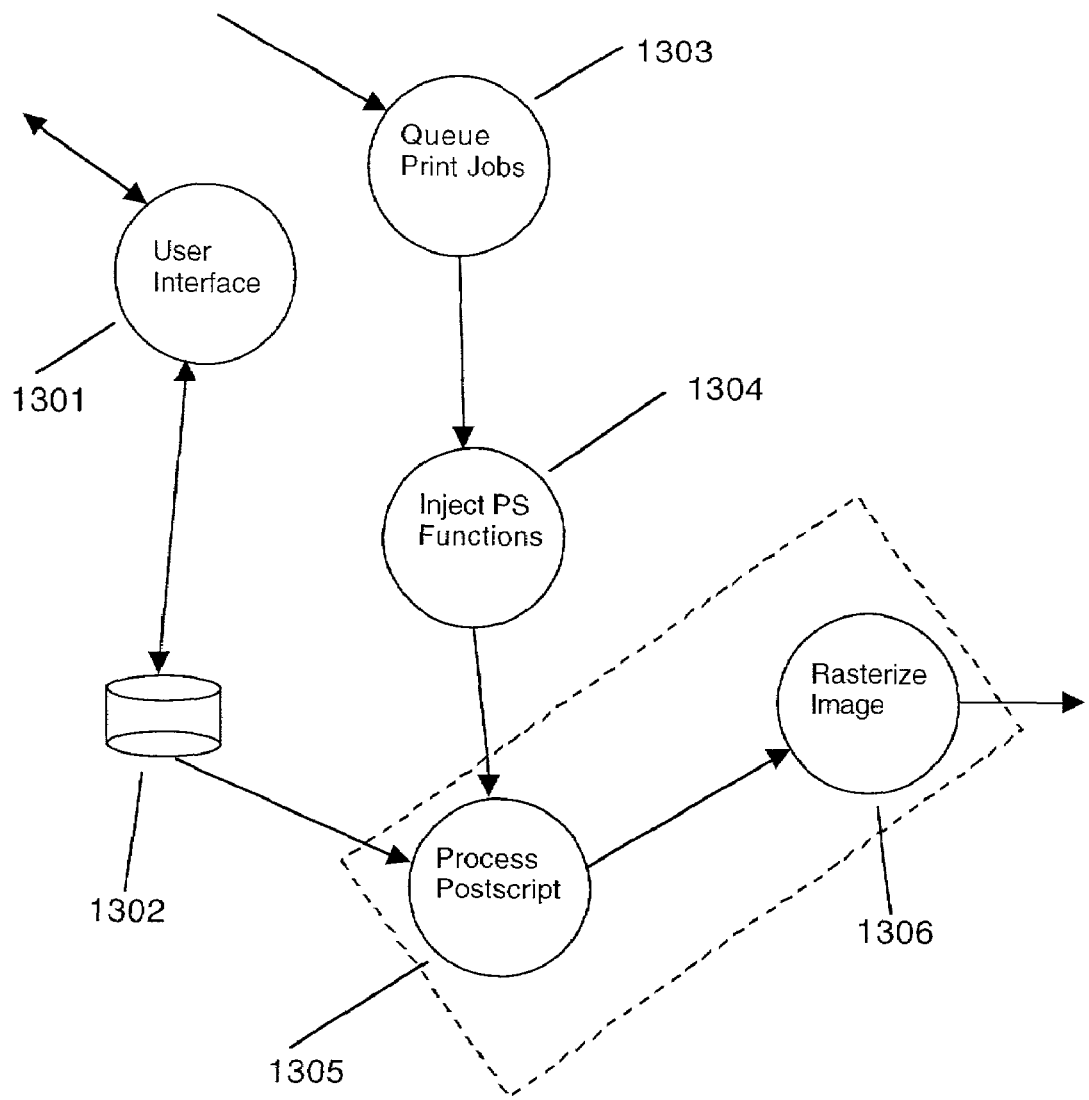
FIG. 13 is a block schematic diagram of a task-oriented viewpoint of a preferred embodiment of the invention illustrating the RIP tasks according to the invention.

With respect to FIG. 13, a task viewpoint of the invention is shown. The User Interface module 1301 handles user modifications and additions of spot color patterns in the database 1302 as described above. All print jobs enter the RIP through the Queue Print Jobs module 1303. Print jobs are sent to the Inject PS Functions module 1304 where additional Postscript® code is injected to the beginning of the job that redefines the spot color Postscript operators to paint the background or paint into any shape or form on the page. The injected code causes the redefined operators to do the appropriate lookups and callbacks. The injected code also adds to the print job or the general environment, other functionality needed to perform other tasks such as mirroring or four-way mirroring (to prevent stitches from appearing).

The job is then sent to the Process Postscript® module 1305 which processes the entire job and executes the Postscript® code, extracting the spot color pattern image from the database 1302 and painting the spot color pattern image where required in the job. The job is simultaneously rasterized in the Rasterize Image module 1306 and later sent to the printer.

Figure 14:
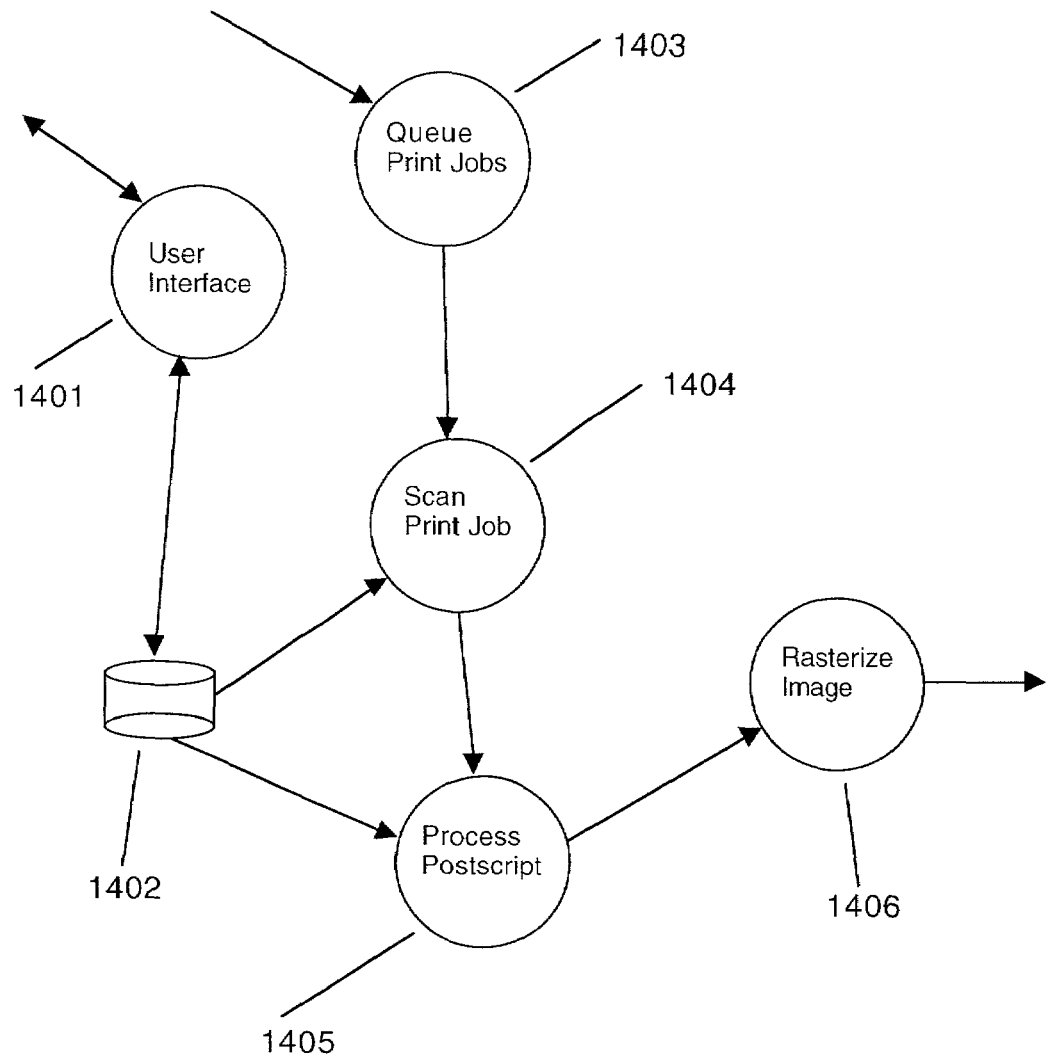
FIG. 14 is a block schematic diagram of a task-oriented viewpoint of another preferred embodiment of the invention illustrating the RIP tasks according to the invention.

With respect to FIG. 14, a task viewpoint of another embodiment of the invention is shown. The User Interface module 1401 handles user modifications and additions of spot color patterns in the database 1402 as described above. All print jobs enter the RIP through the Queue Print Jobs module 1403. Print jobs are sent to the Scan Print Job module 1404 which checks and verifies with the database 1402 any spot color patterns named in the job. If a valid spot color pattern is named, then the Scan Print Job module 1404 inserts the Postscript® code to paint the background or paint into any shape or form on the page into the job's code. The Scan Print Job module 1404 also adds any other Postscript® code needed to perform other tasks such as mirroring or four-way mirroring (to prevent stitches from appearing).

The job is then sent to the Process Postscript® module 1405 which processes the entire job and executes the Postscript® code, extracting the spot color pattern image from the database 1402 for processing and painting the spot color pattern image where required in the job. The job is simultaneously rasterized in the Rasterize Image module 1406 and later sent to the printer.

Figure 15:
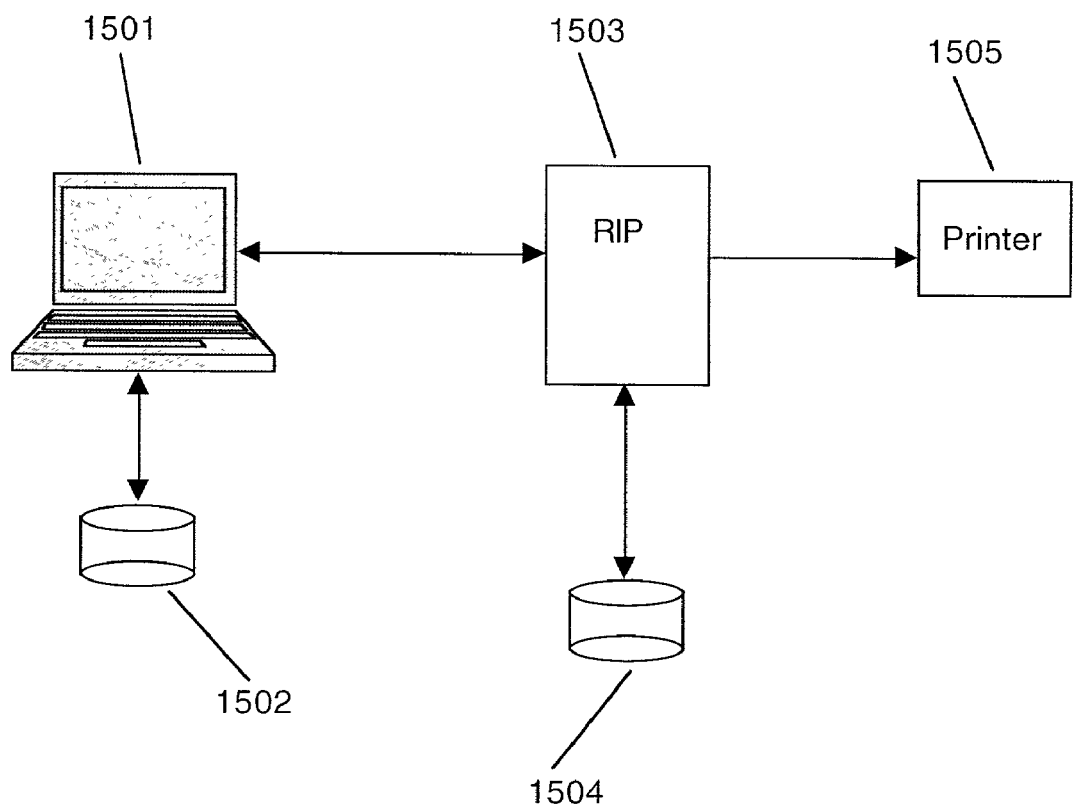
FIG. 15 is a block schematic diagram of a dynamic transfer approach illustrating the transfer of spot color patterns between application programs and a RIP according to the invention.

Referring to FIG. 15, the invention also provides a mechanism for application programs (through plug ins or code modifications) that allows the application program to access a custom spot color pattern by requesting the pattern from the RIP. When a user specifies a spot color pattern that is unknown to an application program 1501, the application program 1501 queries the RIP 1503 for the spot color pattern. If the RIP 1503 has the spot color pattern defined in its database 1504, it will send the spot color pattern to the application program 1501. The application program 1501 stores the spot color pattern locally 1502 and uses it for further references by the user. This provides the user with the ability to preview the spot color pattern using a WYSWIG application program.

The application program 1501 can also store spot color pattern definitions within its own database 1502 that allows users to define and specify a particular spot color pattern. When the user wants to print a job, the application program 1501 queries the RIP 1503 to see if the RIP 1503 has the spot color pattern in its database 1504 and downloads it to the RIP 1503 if the RIP does not have the spot color pattern in its database 1504. The application program 1501 can also blindly download any required spot color patterns to the RIP 1503 whenever a job is printed in order to achieve consistency between jobs for that particular application program 1501.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:
1. A process for simulating printing media comprising:
   providing a database comprising a spot color name associated with corresponding image data that simulates printing media;
   receiving a print job comprising page description language ("PDL") code that includes a reference to the spot color name;
   identifying the spot color name in the PDL code;

retrieving from the database the corresponding image data associated with the identified spot color name;

adding PDL code of the print job for painting the retrieved image data as a PostScript pattern in the print job, said PostScript pattern comprising a repeating unit;

executing the PDL code in the print job; and painting the retrieved image data as a PostScript pattern in the print job.

2. The process of claim 1, wherein the image data are definable by a user.

3. The process of claim 1, further comprising providing a user interface that allows a user to create, modify and/or delete the image data and the spot color name in the database.

4. The process of claim 1, further comprising adding additional PDL code to the print job to perform other tasks that include mirroring or four-way mirroring to prevent stitches from appearing in printed output.

5. An apparatus for simulating printing media comprising:

a database that comprises a spot color name associated with corresponding image data that simulates printing media;

a module for receiving a print job comprising page description language ("PDL") code that includes a reference to the spot color name in the PDL code;

a module for retrieving from the database the corresponding image data associated with the identified spot color name;

a module for adding PDL code to the print job for painting the retrieved image data as a PostScript pattern in the print job, said PostScript pattern comprising a repeating unit;

a module for executing the PDL code in the print job; and a module for painting the retrieved image data as a PostScript pattern in the print job.

6. The apparatus of claim 5, wherein the image data are definable by a user.

7. The apparatus of claim 5, further comprising a module for providing a user interface that allows users to create, modify and/or delete the image data and the spot color name in the database.

8. The apparatus of claim 5, further comprising a module for adding additional PDL code to the print job to perform other tasks that include mirroring or four-way mirroring to prevent stitches from appearing in printed output.

9. A program storage medium readable by a computer, tangibly embodying a program of instructions executable by the computer to perform a method for simulating media, the steps comprising:

providing a raster image processor ("RIP") that includes a database comprising a spot color name associated with corresponding image data that simulates printing media;

receiving a print job at the RIP, the print job comprising page description language ("PDL") code that includes a reference to the spot color name; and processing the print job on the RIP by:

(a) identifying the spot color name in the PDL code;

(b) retrieving from the database the corresponding image data associated with the identified spot color name;

(c) adding PDL code to the print job for painting the retrieved image data as a PostScript pattern in the print job, said PostScript pattern comprising a repeating unit;

(d) executing the PDL code in the print job; and (e) painting the retrieved image data as a PostScript pattern in the print job.

10. The program storage medium of claim 9, wherein the image data are definable by a user.

11. The program storage medium of claim 9, wherein the method further comprises providing a user interface that allows a user to create, modify and/or delete the image data and the spot color name in the database.

12. The program storage medium of claim 9, wherein the method further comprises adding additional PDL code to the print job to perform other tasks that include mirroring or four-way mirroring to prevent stitches from appearing in printed output.

* * * * *